United States Patent [19]
Diamond et al.

[11] 3,718,135
[45] Feb. 27, 1973

[54] PNEUMOTACHOGRAPH

[75] Inventors: Louis Diamond; William T. Lipscomb, both of Lexington, Ky.

[73] Assignee: The University of Kentucky Research Foundation, Lexintgon, Ky.

[22] Filed: March 1, 1971

[21] Appl. No.: 122,599

[52] U.S. Cl. ............... 128/2.08, 73/205 L, 73/206
[51] Int. Cl. .......................................... A61b 5/08
[58] Field of Search ... 128/2.08, 2.07, 2.05 F, 2.05 E, 128/2.05 D, 2 C, 2 R; 73/205 R, 205 D, 205 L, 206

[56] References Cited

UNITED STATES PATENTS

| | | | |
|---|---|---|---|
| 3,504,542 | 4/1970 | Blevins | 73/205 L |
| 3,410,264 | 11/1968 | Frederik | 128/2.08 X |
| 3,071,001 | 1/1963 | Goldsmith | 73/205 L |
| 3,071,160 | 1/1963 | Weichbrod | 73/205 L X |
| 3,593,576 | 7/1971 | Greer | 73/206 |
| 3,349,619 | 10/1967 | Millar | 73/205 L |

FOREIGN PATENTS OR APPLICATIONS

| | | | |
|---|---|---|---|
| 582,619 | 9/1958 | Italy | 128/2.08 |
| 1,119,459 | 12/1961 | Germany | 128/2.08 |
| 54,117 | 2/1967 | Germany | 73/2.05 L |

*Primary Examiner*—Kyle L. Howell
*Attorney*—William E. Sherwood

[57] ABSTRACT

A pneumotachograph suitable for measuring flow rates of respiratory gases in small animals and comprising essentially a flow-resisting element which can be placed in series with a subject's airway. The pressure drop across the resistive element is proportional to the rate of airflow and is linear over the range of flows which one normally would expect to encounter in small animals (0–2 liters/min.).

6 Claims, 6 Drawing Figures

PATENTED FEB 27 1973 3,718,135

INVENTORS
LOUIS DIAMOND
WILLIAM T. LIPSCOMB

BY W. E. Sherwood

ATTORNEY

INVENTORS
LOUIS DIAMOND
WILLIAM T. LIPSCOMB

BY  W. E. Sherwood
ATTORNEY

PNEUMOTACHOGRAPH

BACKGROUND OF THE INVENTION

The use of small animals in biomedical research is frequently dictated for practical and economic reasons and when such research entails the measurement of rates of volume flow in the respiratory system of the animal the capabilities of conventional pneumotachographs often do not correspond to the requirements of the measurement procedures. The maximum rate of air flow for a small animal, such as a guinea pig for example, is in the order of about two liters per minute or less. Furthermore, if the size of the pneumotachograph is such that it includes a relatively large dead space volume as contrasted with the tidal volume of the animal, the animal will, to a correspondingly large extent, be rebreathing the same gas, resulting in hypoxia and hypercorbia, which first stimulates and then depresses respiration, resulting in aberrant recordings. For these reasons pneumotachographs designed for large animals are not suitable for use with smaller animals.

Moreover, the studies of respiratory function may require a reading of the spontaneous breathing of the animal or measurements at constant tidal volume with the animal connected to a respirator. The pneumotachograph should provide for ready change from one to the other of such readings without loss of accuracy and also should be capable of use with animals of different sizes, and should be light in weight. Conventional pneumotachographs, so far as we are aware, are expensive and in addition do not satisfy all of the requirements as above mentioned. Therefore, it is a purpose of the present invention to provide an improved pneumotachograph which overcomes such disadvantages.

SUMMARY

In accordance with the invention the pneumotachograph includes a body portion to which alternate cap portions may be selectively attached to provide data on small animals breathing spontaneously or with forced breathing. A tracheal cannula is attachable to the body portion an tubular pressure taps communicate with the interior of the body portion and the cap portion on opposite sides of a flow-resisting element housed in the cap portion. These taps are attachable to a conventional pressure transducer adapted to send signals to a conventional oscillograph from which the data is read.

Among the objects of the invention are the provision of an inexpensive, light weight pneumotachograph suitable for securing reliable data in the measurement of ventilatory mechanics of small animals; the provision of a pneumotachograph characterized by its small dead space volume and its linear pressure-flow relationship when employed with small animals; and the provision of a pneumotachograph to which cannulae having standard sized lateral stem and varied sized tracheal tubes may be detachably connected.

These and other objects and advantages of the invention will become more apparent as the description proceeds and when considered in conjunction with the accompanying drawings in which FIG. 1 is schematic view illustrating the practice of the invention with the animal connected to a respirator and indicating one type of oscillograph readings.

Figure 2:
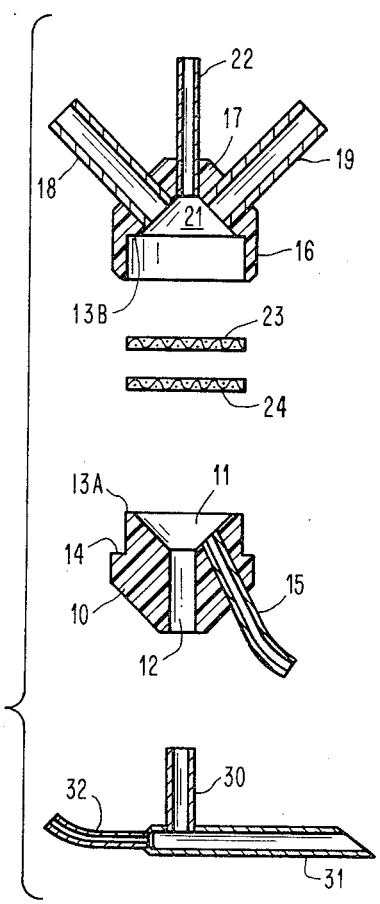
FIG. 2 is an exploded view of the parts of the pneumotachograph shown in section, and adapted for ready assembly for use with the animal in taking readings as illustrated in FIG. 1.

Referring first to FIG. 2 a body portion 10 preferably formed of a light weight, corrosion resistant plastic, such as Lucite, has at one end an interiorly shaped small conical recess 11 and with a bore 12, for example about 0.019 inch in diameter, extending from the recess axially to the other end of the body portion. An annular slot is formed about the one end of the body portion leaving a first annular shoulder 13A against which a flow resistance element may be secured, and an intermediate second annular shoulder 14 against which the annular edge of a cap member may be secured. Mounted within the body portion is a hollow pressure tap member 15 which conveniently may be a length of 17-gauge metallic tubing. Significantly, the interior end of this tubing communicates with recess 11 at the surface of the conical wall at a location displaced from bore 12 sufficiently far to avoid any significant Venturi-flow effect at pressure tap 15 when gas is moving through both the bore 12 and the recess 11.

A cap member is provided for assembly upon the described body portion and as seen in FIG. 2 such member may likewise be formed of Lucite with a cylindrical wall 16 whose lower edge is chamfered and is adapted to abut the shoulder 14, and with an apertured dome portion 17 into which are affixed a pair of tubes 18, 19 which lead to a conventional respiration pump 20 (FIG. 1) and which tubes for example may be of 9-gauge tubing. Beneath the dome portion a small conical space 21 is provided and communicating therewith is a pressure tap member 22 which likewise may be a length of 17-gauge metallic tubing. A suitable flow-resisting element of low resistance as compared to that of the animal's own respiratory system is housed within the space in the cap member and conveniently may embody one or more disc like screens 23, 24 stacked together and pressed between the shoulder 13A of the body portion 10, and the shoulder 13B of the cap portion. The actual number of screens used depends upon the sensitivity of the pressure transducer used, the flow rates encountered, the signal to noise ratio, and the animal's own air flow resistance. These screens, for example, may be of 400-mesh stainless steel wire cloth.

For use with the described apparatus a tracheal cannula having a standard sized laterally extending tubular stem 30 is employed. This stem connects the cannula to the bore 12 of the assembled pneumotachograph and communicates with the tracheal tube 31 and with the upwardly curved extension tube 32 for taking optional tracheal pressure measurements at the cephalad end of the cannula. This extension tube may be of 17-gauge needle-stock silver soldered to the remainder of the cannula and can be removed and replaced with a solder plug if tracheal pressure measurements are not needed. Since the cannula is selectively employed without modification of the remainder of the assembled pneumotachograph, it is possible for the technician to employ a variety of cannulae having a standard size stem 30 and varying diameters of the tracheal tube 31 thus to work with different sized animals.

Figure 1:
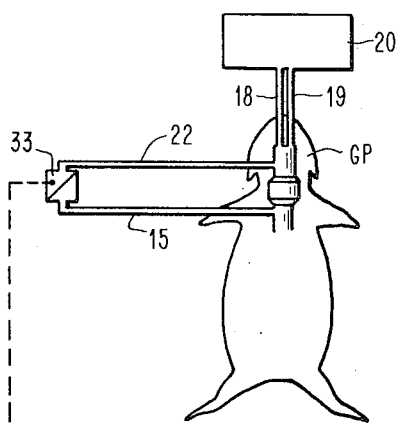

Referring now to FIG. 1 and assuming that a guinea pig GP has the tracheal arm 31 emplaced in its trachea and is undergoing respiration by means of pump 20, the invention is employed by having the described pressure taps 15 and 22 connected to a conventional differential pressure transducer 33 in which the pressure difference across the flow-resistance element is measured to provide gas flow data in the experiment. Conveniently, this transducer 33 may comprise the Statham Model PM 283 TC ± 0.15 connected to a multi-channel oscillograph 34 which for example may be the Electronics for Medicine Model DR 8 oscillograph. Associated with this oscillograph are the customary circuits including an integrator 35 and screen 40. During the experiment characteristic traces 41 and 42, representing respectively the rate of flow and the tidal volume of the animal's respiratory system are displayed on the screen.

Figure 5:
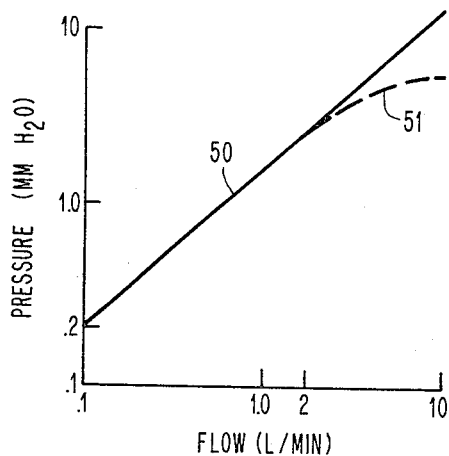
FIG. 5 is a graph indicating the pressure-flow relationship of the apparatus with the animal on the respirator.

As above indicated, a feature of the invention involves the use of a relatively small dead space volume in the calibrated, compact pneumotachograph and its associated connections. For example, in one form of apparatus the combined volume of recess 11 and space 21 amounts to only 0.27 c.c. and the weight of the pneumotachograph is only 4.31 grams. The significance of this characteristic of the invention may be noted from the graphs of FIGS. 5 and 5A wherein the graph of FIG. 5 shows that when the animal is on the described respirator the measured flow in the inspiratory direction, shown by solid line 50, is linear up to a flow rate of at least 10 liters per minute. At the same time the flow in the expiratory direction remains linear up to a flow rate of about 2 liters per minute after which it deviates as shown by dotted line 51, due to the dispropoitionately smaller pressure changes encountered at higher rates of flow. Accordingly, for use on small animals whose flow rates are not more than 2 liters per minute, the traces 41 and 42 on the oscilloscope screen are reliable and may be employed to secure accurate experimental data.

Figure 3:
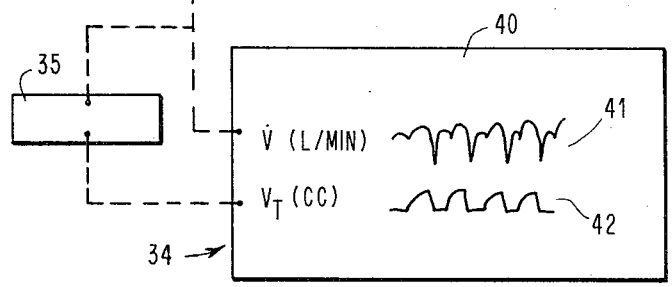
FIG. 3 is an exploded view of the alternate cap portion of the pneumotachograph for use with a spontaneously breathing animal.
Figure 3:
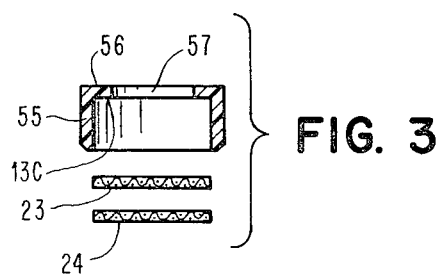
Figure 4:
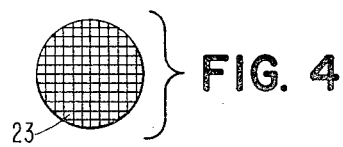
FIG. 4 is a plan view of one of the flow-resisting elements.
Figure 5A:
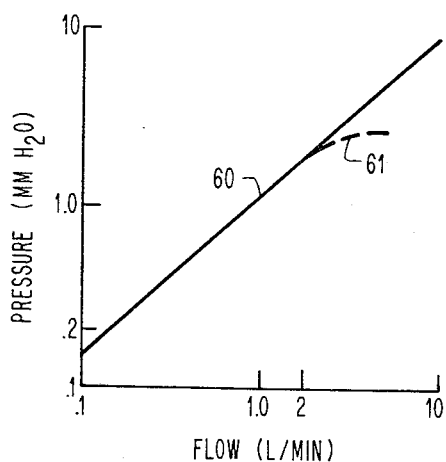
FIG. 5A is a similar chart indicating the pressure-flow relationship with the animal breathing spontaneously.

As will be understood, certain experiments also require that the pneumotachograph be used with animals breathing spontaneously and in this usage an alternative form of cap member as seen in FIG. 3 is employed. This member comprises only a shallow cap having a cylindrical wall 55 chamfered at its lower end and a top 56 with an aperture 57 extending therethrough. As in the case of the previously described cap, the edge of the wall 55 is adapted to abut against the shoulder 14 of the body portion and the screens 23, 24 are housed within the cap and pressed between the shoulder 13A of the body portion and the shoulder 13C of the cap portion. In this modification the experiment is conducted with the conduit 22 of the pressure transducer being open to the ambient atmosphere, as is the aperture 57 in the cap member. As seen in FIG. 5A, the calibrated pneumotachograph using the cap of FIG. 3 shows that the measured flow in the inspiratory direction, indicated by solid line 60, is linear up to a flow rate of at least 10 liters per minute. At the same time the flow in the expiratory direction remains linear up to a flow rate of about 1.9 liters per minute after which it deviates as shown by the dotted line 61. In one form of apparatus employing the cap of FIG. 3, the dead space volume amounted to only 0.18 c.c. and the total weight of the pneumotachograph was only 2.36 gram.

In the event that the animal being employed has a larger or smaller trachea than the animal used on the immediately preceding test all that the technician has to do is to select a cannula with the appropriate sized tracheal arm 31 and use the same without further modification of the assembled pneumotachograph, it being understood that all such cannulae will have a standard sized stem 30.

Obviously many modifications and variations of the present invention are possible in the light of the above teachings. It is therefore to be understood that within the scope of the appended claims the invention may be practiced otherwise than as specifically described.

What is claimed is:

1. A pneumotachograph for use with small animals and characterized by its relatively small dead space volume and its linear pressure-flow relationship comprising, a body portion having a relatively small recess therein at one end thereof and a central bore extending from said recess to the other end thereof, said body portion having an annular slot formed at the periphery of said one end thereof and providing spaced first and second annular shoulders, said body portion having a tubular pressure tap extending externally from said recess and spaced sufficiently far from said bore to avoid Venturi-flow effects, a cap portion detachably mounted on said body portion, a disc-shaped flow resisting element housed in said cap portion, an aperture means in said cap portion above said element, said cap portion having a lower annular edge adapted to fit against said second shoulder of said body portion with said flow resisting element being held against said first shoulder, said cap having a relatively small space therein above said element communicating with said aperture means, and a removable cannula having one tubular leg portion adapted to be emplaced in the trachea of the animal and a laterally extending hollow stem portion connected to the bore in said body portion and to said tubular leg portion.

2. Apparatus as defined in claim 1 wherein the aperture means in said cap portion establishes communication between said space within said cap and the ambient atmosphere.

3. Apparatus as defined in claim 1 including a tubular pressure tap connected to said aperture means in said cap portion, and a pair of tubes extending through said cap portion and communicating with said relatively small space above said flow resisting element.

4. Apparatus as defined in claim 1 wherein said flow-resisting element comprises fine-mesh wire cloth.

5. Apparatus as defined in claim 1 wherein said body portion and said cap portion comprise light weight plastic.

6. Apparatus as defined in claim 1 wherein the combined volume of said space and of said recess is not more than about 0.3 cubic centimeter.

* * * * *